Dec. 18, 1928.　　　　　　　　　　　1,696,027
E. P. BULLARD, JR
AUTOMATIC MULTIPLE SPINDLE LATHE
Filed Dec. 13, 1924　　　5 Sheets-Sheet 1

INVENTOR.
Edward P. Bullard, Jr.
BY
Chamberlain & Newman ATTORNEYS.

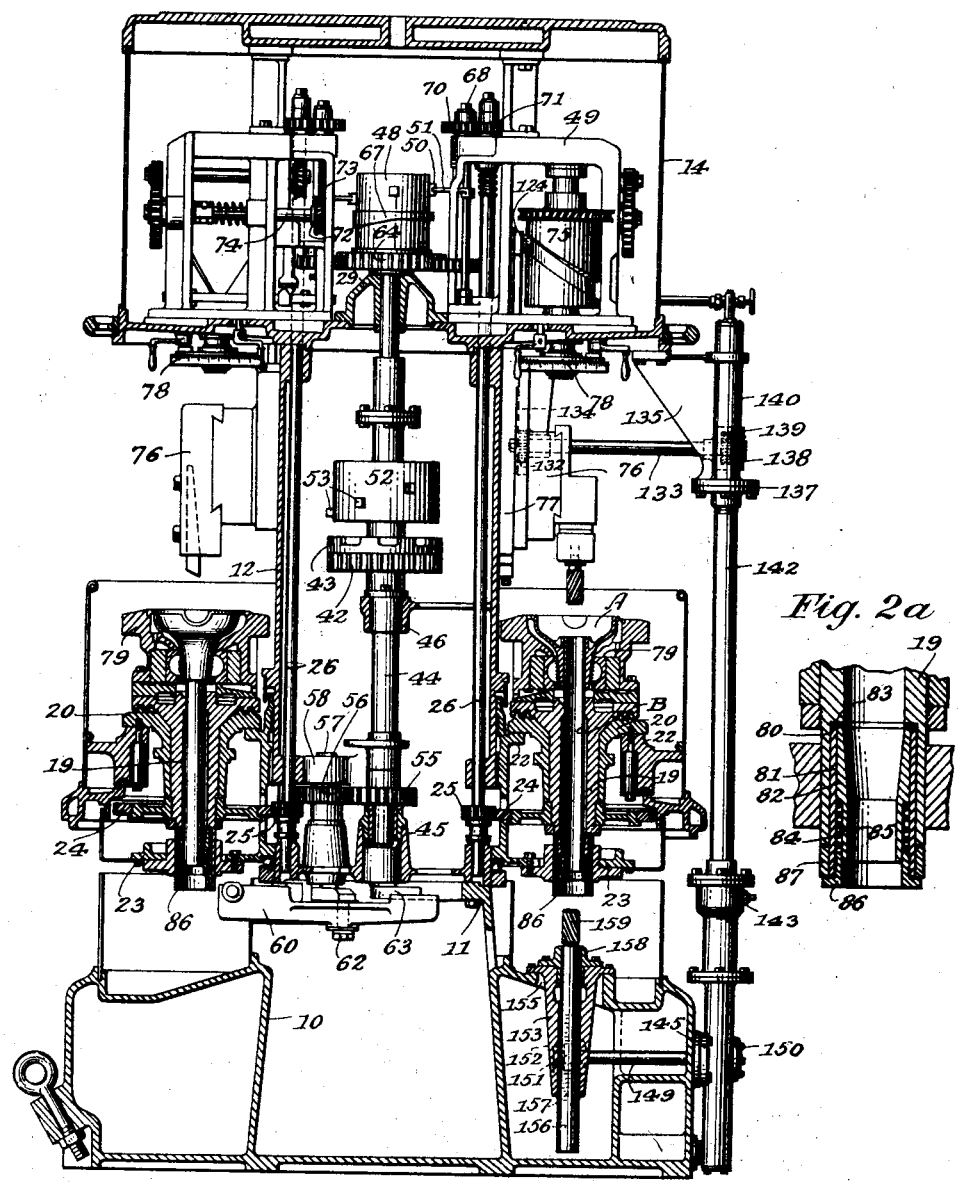

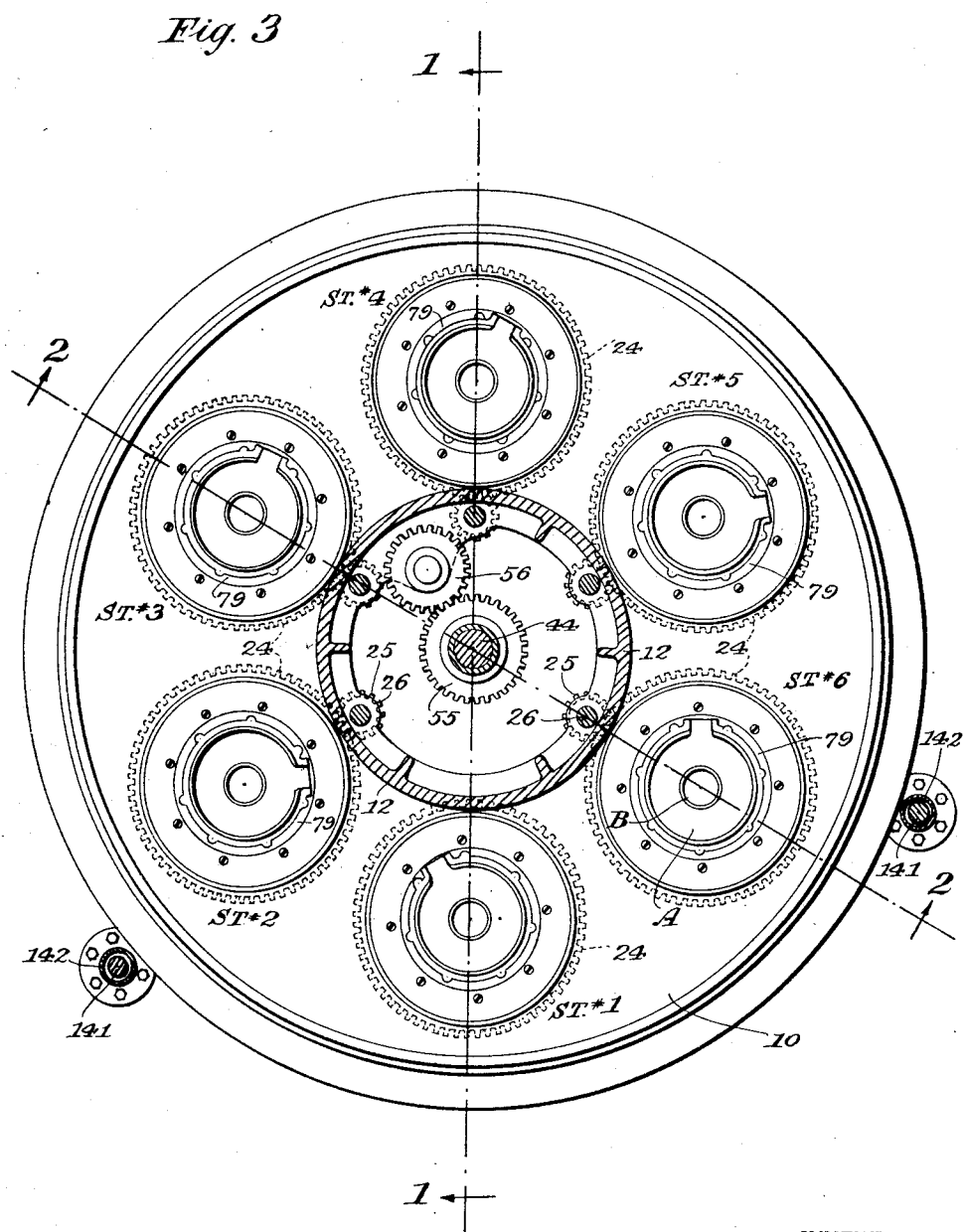

Dec. 18, 1928.                     E. P. BULLARD, JR                        1,696,027
                        AUTOMATIC MULTIPLE SPINDLE LATHE
                        Filed Dec. 13, 1924            5 Sheets-Sheet  4
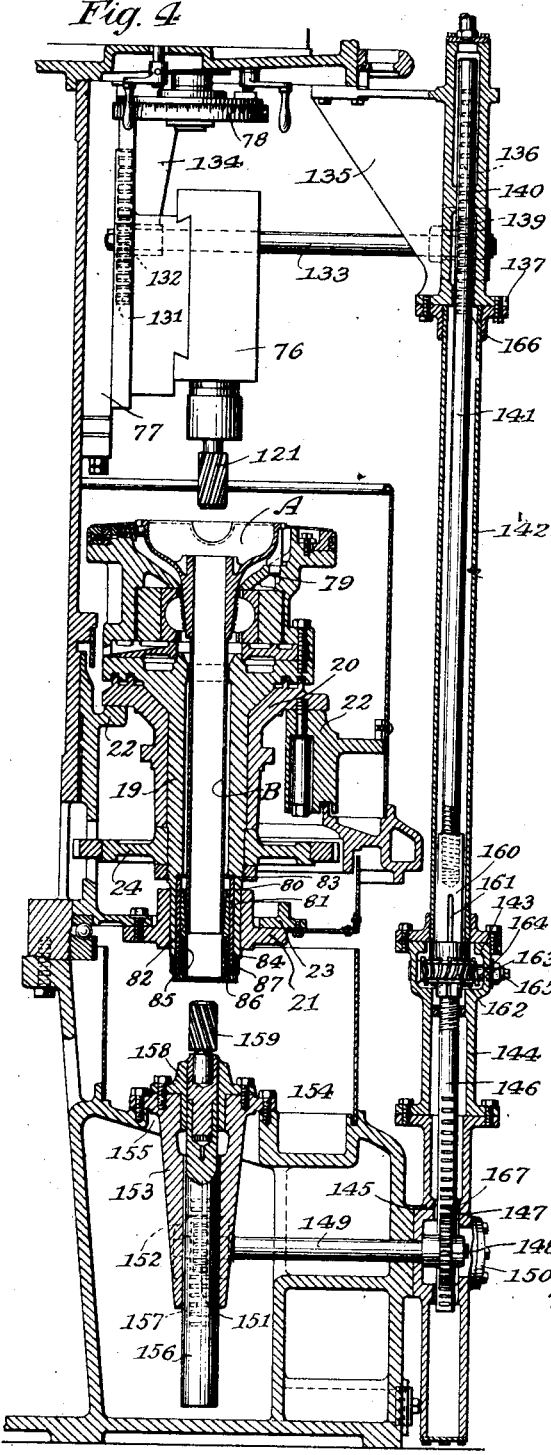
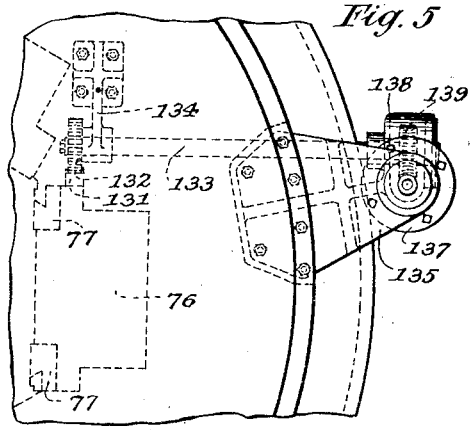
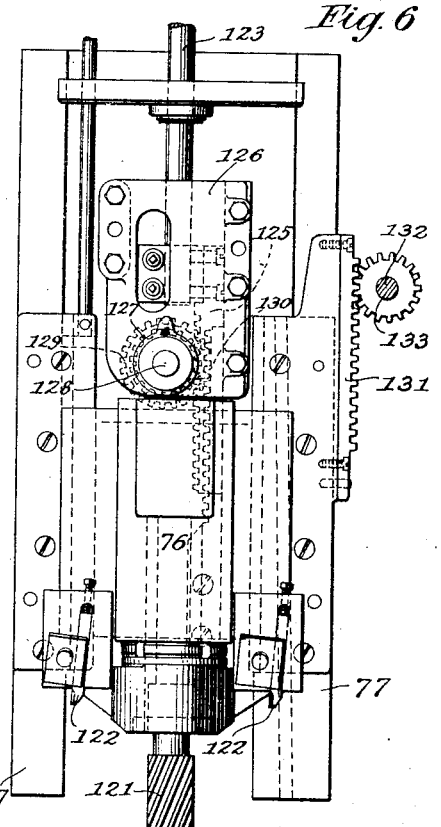
INVENTOR.
*Edward P. Bullard, Jr.*
BY
*Chamberlain & Newman* Attys

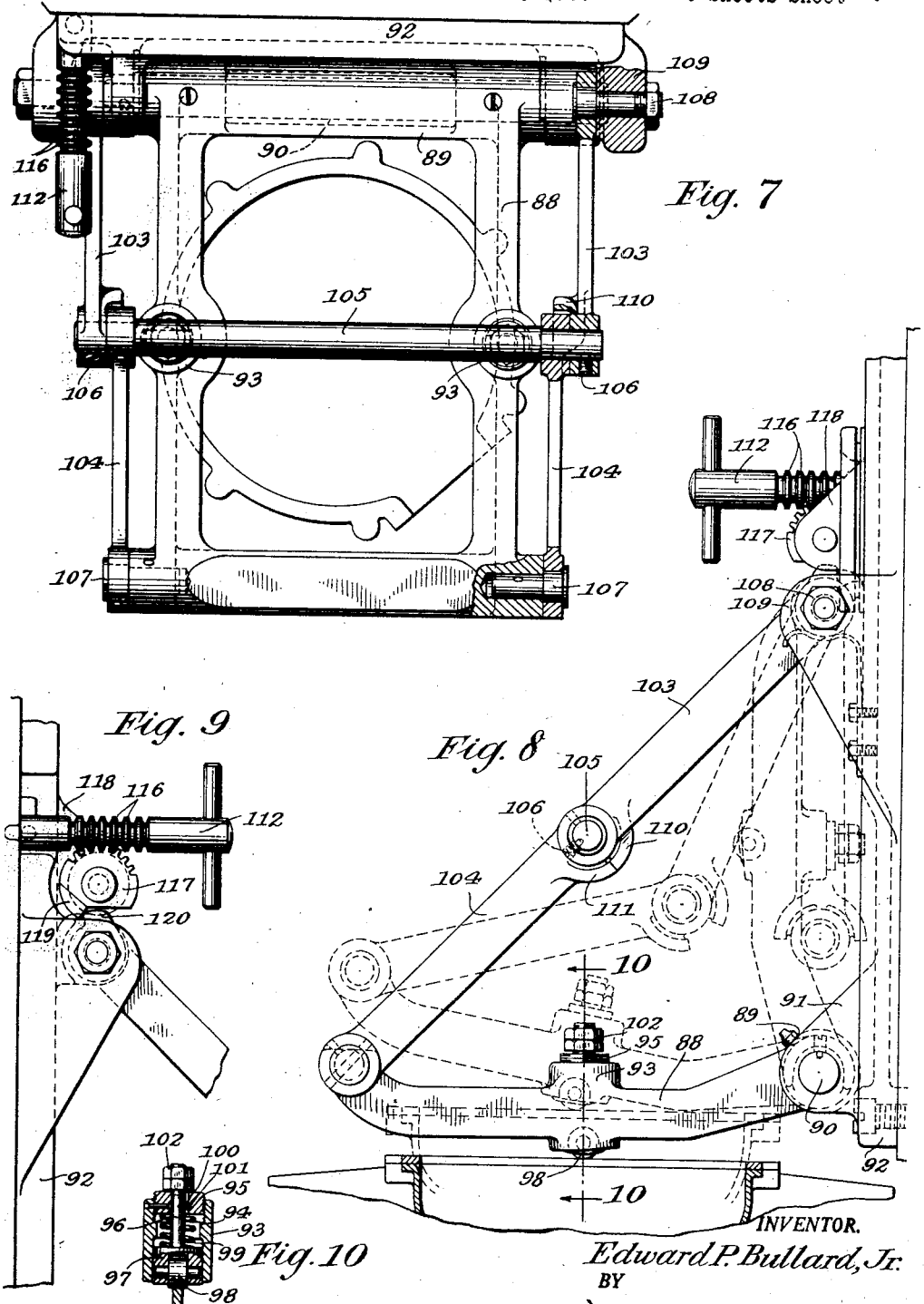

Patented Dec. 18, 1928.

1,696,027

UNITED STATES PATENT OFFICE.

EDWARD P. BULLARD, JR., OF STRATFORD, CONNECTICUT, ASSIGNOR TO THE BULLARD MACHINE TOOL COMPANY, OF BRIDGEPORT, CONNECTICUT, A CORPORATION OF CONNECTICUT.

AUTOMATIC MULTIPLE-SPINDLE LATHE.

Application filed December 13, 1924. Serial No. 755,626.

The present invention relates to an improved automatic multiple spindle machine tool of the type commercially known as the Bullard mult-au-matic, the illustrated embodiment being particularly adapted for performing the machining operations upon rear axle housings for automobiles, although it will be understood of course that the invention is not limited to such use and may be employed for machining other articles presenting substantially the same problems.

The machine in general is styled after and is an improvement upon my former multiple spindle machines for which Letters Patent of the United States No. 1,258,089 were granted March 5, 1918, and No. 1,360,175 were granted November 23, 1920. An object of the invention is to provide such a machine in which a plurality of housings may be worked upon simultaneously, and in which a number of stations are provided with which particular tools are associated for the purpose of successively performing various machining operations upon the housing, certain of these tools being in the nature of reamers for finishing the end bearings of the housing, and others being in the nature of cutters for finishing the several surfaces of the housing that it is desired to have machined.

The machine may have any number of stations depending upon the particular requirements and the desired capacity, the present illustrated embodiment, however, being provided with six stations at each of which there is provided a work carrying table, these tables being mounted upon a common carrier that is intermittently and automatically rotated about a central support in a manner to carry the tables and the work supported thereon from one operating tool to another, said tools being mounted in movable slides operatively connected to the driving mechanism of the machine. One station constitutes a loading and unloading station at which no tool is provided, but at the other five stations the several tools are respectively provided, and each is operated by a separate set of feed works which serves to automatically move its slide into and out of relation with the work. In practice these slides all move simultaneously in the performance of their respective operations, and are tripped off and automatically returned to their normal position as their respective operations are completed.

The several sets of feed works are driven from a common gear and are controlled in their operations by a feed works controller, as will be later more fully referred to.

The machine is therefore designed to perform a number of operations on each of the several pieces of work carried on the several work tables, the said operations being performed on all the tables at the same time, so that the only time lost from a production standpoint is that required for indexing the carrier and moving the work tables from one cutting tool to another. The work is placed upon the work tables at the loading station at which station the tables assume a position of rest while the other tables are being rotated, and the time thus consumed for the operation upon the work upon these other tables is employed in this particular by removing the completed work and placing another piece thereon to be operated upon. As described more fully in the patents above referred to, the work carrying tables only rotate when in position beneath their respective tool carrying slides, and while in such positions may be operated at any desired rate of speed, the speed being determined by change gears connected with the feed works, so that if a number of pieces of work are to be performed, each requiring different operations, and some of which operations may necessitate more time than others or a faster rotation of the table, this can readily be provided for by setting the machine to drive the different spindles at the particular speeds required. This feature in itself does not form any part of the present invention, but is referred to as being associated with the particular features disclosed herein, and for the particular work contemplated, where it may be desirable to employ more time or different speeds of rotation at different stations.

With the above and other objects in view an embodiment of the invention is shown in the accompanying drawings, and this embodiment will be hereinafter more fully described with reference thereto, and the invention will be finally pointed out in the claims.

In the drawings:—

Fig. 1 is a vertical sectional view of a machine according to the present embodiment of the invention, the view being taken along the line 1—1 of Fig. 3 and illustrating the unloading and loading station and the diametrically opposite station, these stations being referred to in the description as stations 1 and 4; and also showing the feed works, drive and indexing mechanisms;

Fig. 1ᵃ is a fragmentary detail plan view, partly in section, of the index mechanism locking means;

Fig. 2 is a vertical sectional view taken along the line 2—2 of Fig. 3, and illustrating two of the work stations, one of which includes vertically movable reaming tools for reaming the end bearings of the rear axle housing, these stations being referred to in the description as stations 3 and 6;

Fig. 2ᵃ is a detail sectional view of one of the work chucks employed;

Fig. 3 is a sectional plan view of the base of the machine taken along the line 3—3 of Fig. 1, and showing the drive means for rotating the several work carrying tables;

Fig. 4 is a vertical sectional view, enlarged, of one of the work stations, namely station 6, showing the reaming tools for reaming the end bearing portions of the housing;

Fig. 5 is a fragmentary plan view of the upper portion of that part of the machine illustrated in Fig. 4 and particularly showing the drive means for the reaming tools.

Fig. 6 is a side elevation of the upper tool slide as employed at the station illustrated in Fig. 4.

Fig. 7 is a plan view, enlarged, of the mechanism employed at the loading station, for seating the work in the work tables and properly positioning it for being subsequently worked upon by the tools.

Fig. 8 is a side elevation thereof showing in full lines the position of the mechanism at which the work is seated, and in dotted lines the initial position of the mechanism as it is engaged with the work.

Fig. 9 is a detail side elevation of a portion of the mechanism, at the opposite side from that shown in Fig. 8, and illustrating the manually operatable means for releasing the seating mechanism; and Fig. 10 is a detail sectional view of the contact means of the work seating mechanism, being taken along the line 10—10 of Fig. 8.

Similar reference characters indicate corresponding parts throughout the several figures of the drawings.

Figures 1, 1A:
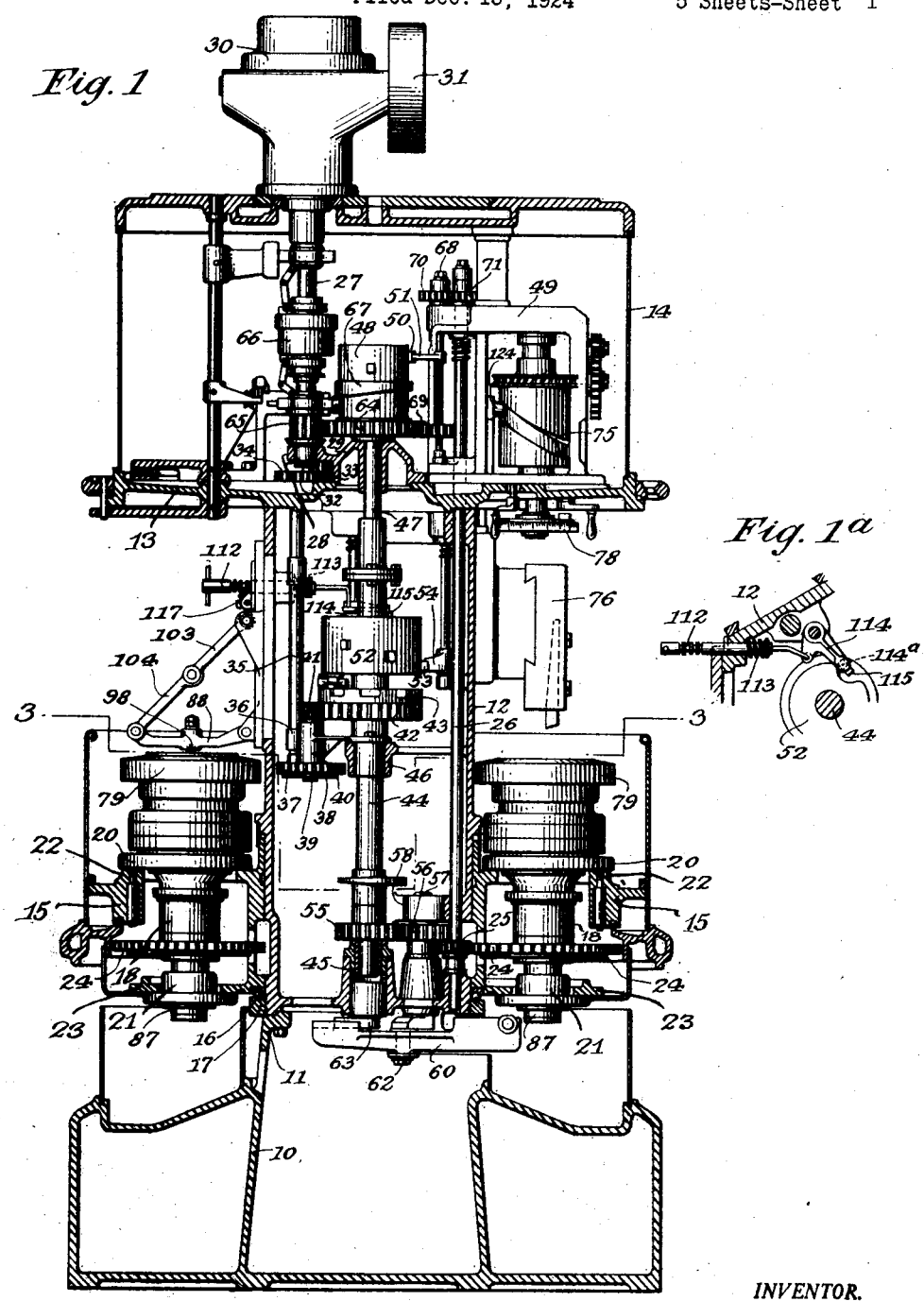

The main frame of the machine according to the present embodiment of the invention consists of a bottom or base member 10 of pan-like formation having suitably disposed strengthening ribs, flanges, and compartments as is usual in such constructions, and provided centrally with a raised bearing or supporting portion 11 upon which the lower end of a central column 12 is supported, this column being substantially round or cylindrical at its lower portion while at its upper portion it is of hexagonal shape for the purpose of supporting the tool carrying slides hereinafter referred to. Upon the upper end of the column there is supported the feed works base 13 which projects beyond the column and supports the feed works housing 14, including a top and side closure plates.

The lower cylindrical portion of the column 12 serves as a central bearing for the rotatable carrier 15, the lower end of this carrier being supported upon thrust bearings 16 of the ball type, the supporting race ring 17 of which is secured to the lower end of the column 12.

The work carrying table 18, six in number, as well as their spindle bearings are alike in construction and therefore the same reference numerals are used to designate the same parts of the several tables. These tables each include a central spindle 19 that is journaled in spindle bearings 20 and 21 supported upon suitable supporting portions 22 and 23 of the carrier, and upon each of said spindles there is mounted a gear 24 that meshes with and is driven by a slidable gear 25, of which there are five splined to the same number of vertical drive shafts 26 journaled in the column 12 and in the base 13 of the feed works. These shafts and slide gears as seen in Fig. 3 are positioned as between the column 12 and the operatable position of the spindles of the work carrying tables so as to form a positive engagement and drive from the slide gears to the larger gears 24 when the tables are moved into their working positions through the indexing member of the carrier, as will be more fully hereinafter pointed out. The large gears move from one slide gear to another with each indexing of the carrier, simply passing out of mesh with the slide gears as the carrier is indexed, whereas the slide gears, in the meantime, are raised by suitable mechanism, not shown, and again dropped into mesh with the large gears as they move forward and become positioned at their operating stations. Inasmuch as the mechanism for sliding the slide gears 25 does not form a part of the present invention, it has not been deemed necessary to illustrate it herein, a suitable mechanism for this purpose being shown and described in my Patent No. 1,360,175 above referred to.

The machine is designed to be operated from a single shaft which is preferably located in the feed works housing, and designated as 27, and in this particular illustration constitutes a vertical spindle having its lower end journaled in a bearing portion 28 projecting at one side of the central bearing member 29 provided centrally of the base 13, and having its upper end extended into and journaled in a gear housing 30 containing suitable transmission gears driven from any suitable source of power, as for instance by belting extended over the pulley 31 or by an electric motor directly coupled therewith.

Upon the lower end of this shaft 27 there is secured a pinion 32 which meshes with and drives an idle pinion 33 rotatably mounted upon the feed works base, and which in turn meshes with and drives a gear 34 provided upon a vertical shaft 35, one end of which is journaled in a bearing 36 formed upon the inside of the column 12 while the other end is journaled in the base plate of the feed works. Upon the lower end of this shaft there is provided a pinion 37 that meshes with and drives a gear 38 upon a short shaft 39 journaled in a bearing 40 formed upon the inner side of the column 12, and upon the upper end of said shaft is provided a pinion 41 that meshes with a gear 42 having an upper clutch face 43, and loosely journaled upon a central shaft 44, this shaft being journaled at its lower end upon a thrust-bearing portion 45 provided in the lower end of the column 12 and in a central bearing 46 supported from the interior of the column 12 just below the gear 42.

The shaft 44 is connected to an upper control shaft 47 journaled in the bearing 29 and provided at its upper end with a controller cam 48 for periodically tripping the feed works, indicated generally as 49, through contact of a trip member 50 with a feed works trip 51, there being one of these trip members for each feed works, and each at a different level, so that upon each rotation of the controller cam the several feed works are started.

The shaft 27 and the shaft 35 geared thereto, and also the gear 42 are continuously driven during the operation of the machine.

A clutch indicated generally as 52, is provided upon shaft 47, and carrier lugs 53, one for each tool slide, and at a different level, the clutch adapted to be released by means of movable retaining fingers 54 normally engaged with the lugs, adapted as the tool slides reach the end of their upward movement to be disengaged from the lugs to release the clutch. The provision of the lugs 53 and retaining fingers for each tool slide insures that the clutch will only be operated after all the slides are fully up. The clutch is of a type described more fully in the patents above referred to, and adapted to be automatically connected upon the release with the gear 42, through the clutch face 43 of the latter, and to rotate with said gear during a single revolution being automatically disconnected at the end of this single revolution. The shaft 44 and the controller 48 are therefore rotated through a single revolution for each cycle of operation of the tool slides. This serves to index the carrier, trip the feed works, and stop and start the rotation of the work table driving shafts which are automatically stopped during the indexing periods, as will be presently more fully pointed out.

The indexing mechanism comprises a gear 55 that meshes with and drives another gear 56 mounted upon a crank shaft 57 journaled in bearings 58 formed upon the inner side of the column 12, said shaft carrying upon its lower end a pivotally mounted indexing arm 59 having a straight guideway 60 formed in its upper face to engage and disengage the several spindle ends to index the carrier. In practice this arm is given oscillatory movement by reason of its being carried upon the stud end 62 of the rotatable crank shaft and slidably connected to a shoe 63 rotatably mounted in the bearing 45, the operation of the arm being sufficient to constitute one-sixth of a turn of the carrier, thus moving the work tables from one operating station to the next. The indexing arm as shown in Figs. 1 and 2 is in its retracted or non-engaging position out of the path of the spindles and is adapted in its projected operative positions to move outwardly into embracing relation with the spindles.

Upon the shaft 47 between the bearing 29 and the controller cam 48 there is loosely mounted a large gear 64, which meshes with a pinion 65 carried upon the drive shaft 27 and adapted to be connected therewith by means of a clutch 66, which is connected and disconnected by means of a cam 67, carried upon the controller cam, the design of this cam being such that the clutch is disconnected during the indexing periods, and inasmuch as the gear 64 drives the several feed works and also the work table driving shafts, it will be seen that these parts are stationary during these indexing periods. Each of the feed works carries a vertical shaft 68, provided at its lower end with a gear 69, meshed with the large gear 64, and provided at its upper end with a gear 70 meshing with and driving a gear 71 provided at the upper end of the table driving shaft 26. The shaft 68 also carries a worm 72 (Fig. 2) which meshes with a worm gear 73 provided on the end of the feed works driving shaft 74 and which in turn drives a cam drum 75 adapted to raise and lower the tool slide, the latter, indicated as 76, being mounted beneath the feed works in suitable slide ways 77 provided in the column 12. Regulating dials, indicated as 78, are provided for each of the feed works for controlling the relative movements of the tool slides.

The work tables are each provided at their upper ends with a chuck 79 of the floating type and designed to receive and secure the upper end portion of the rear axles housing or other work. The particular work contemplated herein consists of a differential housing portion A adapted to be gripped within the floating chuck and a shaft enclosing bearing sleeve B extending downwardly through the spindle 19 in the chucked position of the work.

Inasmuch as the floating chuck, proper, forms no part of the present invention, no further detailed description of the same is deemed necessary, it being sufficient to remark that it is of a type adapted to centralize and securely grip the work after it has been accurately pressed and positioned therein by work seating means, presently to be described.

At its lower end the spindle 19 is annularly recessed, as at 80, and has a resilient chuck provided therein, adapted to grip and centralize the lower end of the axle housing sleeve, and also adapted upon release of the upper end at the unloading station, through disengagement of the floating chuck, to impart an upward thrust to the work to facilitate its removal. This chuck consists of a sleeve 81 seated and secured in the recess 80, in which a slidable sleeve 82 is engaged having a tapered bore adapted to be engaged by said end of the axle housing, said sleeve 82 being normally pressed upwardly, as shown in Fig. 2ª so that its upper end engages a stop ring 83 interposed between the upper end of the recess 80 of the upper end of the sleeve 81, by means of a coil spring 84 disposed within an annular recess 85 formed in the lower end of the sleeve 82 and held within said recess by means of a flanged collar 86 threaded into the lower end of the sleeve 81. The flange of this collar extends laterally beyond the sleeve 81 and supports a rotatable roller ring 87 surrounding the projecting lower end of said sleeve 81. This roller ring is adapted to be contacted by the indexing arm, and inasmuch as said arm engages it with a sliding movement the ring is partially rotated during each indexing operation and a new surface is repeatedly presented for the successive engagements by the indexing arm, so that wear upon the roller is uniformly distributed.

The work seating means for positioning the housing in the spindle is provided at the loading and unloading station, station 1, as shown in Figs. 1, 7, 8 and 9, and consists of a rectangular frame member 88 provided with an inner tubular bearing end 89, in which is secured a shaft 90 projecting at each end and rotatably supported in bearing brackets 91 provided at the lower corners of a fixture plate 92 secured to the flat face of the column 12 at said station.

Upon each side arm of the frame there is provided a tubular boss 93, having an interior shoulder 94 spaced from each end, and being threaded interiorly above said shoulder. A tubular bushing 95 is adjustably screwed into the threaded portion and has slidably engaged therein the stem 96 of a plunger 97, provided with a projecting contact roller 98, a spring 99 normally pressing the plunger outwardly. The plunger is held against turning movement by means of a pin 100 provided in the stem 96 engaging a slot 101 provided in the bushing 95. The shoulder 94 is adapted to limit the inward movement of the plunger, and lock-nuts 102 are provided upon the threaded end of the stem 96 to limit the outward movement. The two contacting rollers are so positioned in relation to the work being inserted as to engage the circular end flange of the same at diametrically opposed points, and upon downward pressure being exerted upon the frame press the work into seated relation in the tables, the work being properly seated when the frame is in its horizontal position as shown in Fig. 8.

In order to force and accurately fix the frame in its horizontal work seating position, toggle levers are provided at each side thereof, each comprising arms 103 and 104 pivotally connected to each other by a rod 105, extending transversely between the two toggle levers and being secured at each end by a set screw 106 to the hub of the outer and upper arms 103 and loosely engaged through the hubs of the lower and inner arms 104. The arm 104 of each toggle lever is pivotally connected at its end by a stud 107 to the forward end of the frame, while the arm 103 is pivotally connected by a stud 108 to a bracket portion 109 formed on the fixture 92. Offset studs 110 and 111 are formed upon the respective hub ends on the arms 103 and 104 and are adapted in the straightened out position of the toggle levers to contact, thereby preventing collapse of the toggle and fixing the horizontal position of the frame 88. It will be understood that in practice the operator—after removing a finished housing, and during which operation the seating means is in its folded and inoperative and fully raised position, as shown in dotted lines in Fig. 8—inserts a housing in the work table to the approximate position shown by the dotted lines in Fig. 8, and thereupon moves the seating frame into contact therewith as shown in dotted lines. He then grips the rod 105 and by pulling outwardly straightens out the toggle levers and forces the housing to its seated position, whereupon the work table chuck is tightened to secure the work.

Before the carrier is indexed to the next position the operator disengages the seating means by pressing inwardly upon the rod 105 to break the toggle and raises the frame to its raised inoperative position. Inasmuch as the normal indexing movement of the carrier is automatic and occurs at regular timed intervals and the seating of the work and the release of the seating means is performed manually, it is essential that the seating means be out of engagement with the work before the indexing movement starts, and in order to prevent any possibility of the indexing operation taking place before disengagement of the seating means, which would cause damage to the machine, a safety lock is provided which automatically prevents operation of the indexing means until the seating means is moved out of relation with the work to its inoperative positions. This safety device consists of a slide rod 112 slidably mounted in the column 12 and normally pressed inwardly to its inoperative position by means of a spring 113. At its inner end it is pivotally connected to an arm of a bell-crank lever 114, pivotally mounted on the operating shaft of the trip 54, at this point, and provided at the end of its other arm with a rectangular stop block 114ª adapted in the operative position of the device to be moved into the path of a stop lug 115 provided on the clutch 52 to prevent rotation of the latter, and therefore prevent operation of the indexing mechanism. The shaft 112 is provided at its exterior portion with a circular rack 116 engaged by the toothed portion of a segmental gear 117 rotatably mounted upon a bracket 118 formed upon the fixture 92, said segment being provided at one point with a projecting cam portion 119 adapted to be engaged by a lug 120 formed upon the upper end of the arm 103 of the toggle lever at the left hand side of the frame, and adapted as the frame is raised and lowered to rotate the segment in one of the other directions, thus, as the frame is moved from its inoperative position to its lowered position, the segment is rotated in clockwise direction as shown in Fig. 9 and reciprocates the slide 112 outwardly to rock the bell-crank lever 114 and lock the indexing mechanism, and upon release and raising of the frame to its inoperative position, the segment is rotated in the opposite direction to reciprocate the slide inwardly to release the indexing mechanism.

At stations 2 and 6, and as illustrated in Figs. 2 and 3–6, the tools include reaming means for reaming the upper and lower bearing ends of the sleeve portion B of the rear axle housing, and as these tools are similar except for the fact that those at station 2 take a roughing cut and those at station 6 a finishing cut, only one will be described in detail. The tools carried by the tool slides 76 at these stations include a central reaming tool 121 (Fig. 6) and side cutting tools 122 for taking cuts upon the right angular exterior seating flange of the housing. It will be understood of course that any suitable tools for the particular work may be provided. The tool slide moves at a slightly greater speed than the movement imparting means preferably connected to the feed works, and for this purpose the vertical shaft 123, which is connected to the feed works by means of a roller 124 at its upper end engaging the groove of the cam 75, is provided at its lower end with a vertically disposed rack 125 slidable in the saddle portion 126 secured to the column 12, and which rack meshes with a small gear 127 provided upon a transverse shaft 128 journaled in the saddle, said shaft 128 also having mounted thereon a large gear 129 which meshes with a vertically disposed rack 130 secured to the tool slide 76, mounted, as previously pointed out, to reciprocate in the slideway 77 secured to the column 12. This gearing arrangement causes the tool slide to move at a different and greater speed than the shaft 123.

At one side of the tool slide there is mounted a rack 131, meshing with and adapted to drive a pinion 132 provided at the inner end of a horizontal shaft 133, journaled at one end in a bearing bracket 134, and at its other end in a bracket 135 secured to and projecting outwardly from the base of the feed works housing. This bracket 135 has formed thereon a vertically disposed tubular guide 136 flanged at its lower end, as at 137, and provided above said flange with a gear housing 138 in which is disposed a gear 139 mounted upon the outer end of the shaft 133, and which spiral gear meshes with a rack 140 provided upon a vertically disposed rod 141, having sliding bearing in the tubular portion 136, and extending downwardly from said portion within a tube 142 secured at its upper end to the flange 137 and at its lower end to the upper flanged end 143 of a lower tubular guide member 144 supported at 145 upon the base of the machine. The rod 141 in effect extends into the lower tubular guide 144, by reason of an extension portion 146 provided in said portion 144, and which extension portion is provided with a spiral rack 147, meshing with a pinion 148 provided upon the end of a horizontal shaft 149, journaled in a bearing housing 150 formed upon the portion 144, and provided at its inner end with a gear 151 disposed within a gear housing portion 152 formed upon a tubular tool supporting member 153 supported in the base of the machine by means of its flanged upper end 154 bolted within an opening 155 of the base.

Within the support 153 there is mounted for vertical reciprocation a tool spindle 156 provided along its surface with a rack portion 157 with which the gear 151 is meshed, said spindle extending upwardly through a guide portion 158 secured to the upper end of the supporting portion 153, and provided upon its upper projecting end with a reamer 159.

It will thus be seen that as the upper tool slide moves downwardly and the reamer 121 is engaged in the upper bearing portion of the works, the lower ream 159 is simultaneously raised through the drive consisting of the shafts 133, 141, and 149, and the associated gearing, and engages the lower bearing portion of the work, the two reamers being simultaneously disengaged as the upper tool slide is raised.

In order to adjust the relation of the lower reamer so that it is accurately engaged with the particular work being performed, the shaft 141 and its extension 146 are connected in a manner to be longitudinally adjusted, and for this purpose the adjacent ends of said shaft and its extension are threaded and connected by coupling sleeve 160 having a longitudinal slot 161 therein in which is splined the hub of a gear 162 disposed within a chambered portion 163 at the upper end of the tubular guide member 144, and which gear is meshed with a worm 164 journaled in said chambered portion and provided at its outer end with a wrench engaging end 165. The shaft 141 and its extension 146 are held against rotary movement by suitable splines 166 and 167, and upon rotation being imparted to the coupling sleeve 160, through operation of gear 162, the shafts are moved either toward or away from each other, depending upon the direction in which the gear is turned, to shorten or lengthen the same, this operation serving to adjust the positions of the reamers.

At the other stations, 3, 4 and 5, the tool slides are provided with suitable tools to perform desired machining operations upon the work.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. An automatic machine tool comprising a base, a rotary carrier mounted thereon, a series of rotary work carrying spindles supported in said carrier and each having a longitudinal opening extending therethrough and adapted to receive the work, indexing means for intermittently rotating said carrier to bring the spindles from one station to the next, tool slides including tools disposed at work stations adapted to move downwardly to engage the rotating work at its upper end, and tool means at one of the work stations adapted to move upwardly to engage the rotating work at its lower end simultaneously with its engagement by one of said downwardly moving tools and whereby the simultaneous operation of the downwardly and upwardly moving tools in relation to a single rotating work piece axially aligns and renders co-concentric the respective work thereon by said tools.

2. An automatic machine tool comprising a base, a rotary carrier mounted thereon, a series of rotary work carrying spindles supported in said carrier and each having a longitudinal opening extending therethrough and adapted to receive the work, indexing means for intermittently rotating said carrier to bring the spindles from one station to the next, tool slides at certain of the work stations including tools adapted to move downwardly to engage the rotating work at its upper end, and tool slides at other stations including tools adapted to move upwardly to engage the rotating work at its lower end simultaneously with its engagement by said downwardly moving tools and whereby the simultaneous operation of the downwardly and upwardly moving tools in relation to a single rotating work piece axially aligns and renders co-concentric the respective work thereon by said tools.

3. An automatic machine tool comprising a base, a rotary carrier mounted thereon, a series of rotary work carrying spindles supported in said carrier and each having a longitudinal opening extending therethrough and adapted to receive the work, indexing means for intermittently rotating said carrier to bring the table from one station to the next, tool slides at certain of the work stations including tools adapted to move downwardly to engage the rotating work at its upper end, and tool slides at other stations including tools adapted to simultaneously engage the rotating work at its upper and lower ends and whereby the simultaneous operation of the downwardly and upwardly moving tools in relation to a single rotating work piece axially aligns and renders co-concentric the respective work thereon by said tools.

4. An automatic machine tool comprising a base, a rotary carrier mounted thereon, a series of rotary work carrying spindles supported in said carrier and each having a longitudinal opening extending therethrough and adapted to receive the work, indexing means for intermittently rotating said carrier to bring the spindles from one station to the next, tool slides at certain of the work stations including tools adapted to engage work at its upper and lower ends by movement downwardly and upwardly respectively, and cooperatively connected whereby the upper and lower tools are adapted to be simultaneously moved into and out of relation to the rotating work and whereby the simultaneous operation of the downwardly and upwardly moving tools in relation to a single rotating work piece axially aligns and renders co-concentric the respective work thereon by said tools, and means for operating said tool slides.

5. An automatic machine tool comprising a base, a rotary carrier mounted thereon, a series of rotary work carrying spindles supported in said carrier and each having a longitudinal opening extending therethrough and adapted to receive the work, indexing means for intermittently rotating said carrier to bring the spindles from one station to the next, one of said stations constituting a loading and unloading station, seating means at said loading and unloading station adapted to seat the work in said spindles with a press fit, and tool slides at the other stations including tools adapted to engage the work.

6. An automatic machine tool comprising a base, a rotary carrier mounted thereon, a series of rotary work carrying spindles supported in said carrier and each having a longitudinal opening extending therethrough adapted to receive the work, indexing means for intermittently rotating said carrier to bring the spindles from one station to the next, one of said stations constituting a loading and unloading station, seating means at said loading and unloading station adapted to seat the work in said spindles, tool slides at the other stations including tools adapted to engage the work, and locking means adapted to be operated by said seating means to prevent operation of the indexing means while said seating means is in its operative work-engaging position.

7. In an automatic machine tool of the character described, a work table, a rotary work carrying spindle carried thereby having a longitudinal opening extending therethrough adapted to receive the work in a vertical relation, a vertically reciprocating tool slide mounted in relation to said spindle and including a tool adapted upon operation of said tool slide to be engaged with one end of the rotating work, and a tool cooperatively connected therewith adapted upon operation of said tool slide to be simultaneously engaged with the other end of the rotating work and whereby the simultaneous operation of the downwardly and upwardly moving tools in relation to a single rotating work piece axially aligns and renders co-concentric the respective work thereon by said tools.

8. In an automatic machine tool of the character described, a work table, a work carrying spindle carried thereby and having a longitudinal opening extending therethrough adapted to receive the work, a reciprocating tool slide mounted in relation to said spindle and including a tool adapted upon operation of said tool slide to be engaged with one end of the work, a tool disposed in relation to the other end of the work, and means cooperatively connecting said last named tool to said tool slide whereby it is adapted upon operation of said tool slide to be moved into and out of relation to the work, said means including a rack on said tool slide, a rack on said last named tool, and movement transmitting means meshing with and disposed between said racks.

9. In an automatic machine tool of the character described, a work table, a work carrying spindle carried thereby and having a longitudinal opening extending therethrough adapted to receive the work, a reciprocating tool slide mounted in relation to said spindle and including a tool adapted upon operation of said tool slide to be engaged with one end of the work, and means cooperatively connecting said last named tool to said tool slide whereby it is adapted upon operation of said tool slide to be moved into and out of relation to the work, said means including a vertical rack on said tool slide, a vertical rack on said last named tool, transverse shafts geared to said respective racks, and a vertically disposed movement transmitting shaft geared to said respective transverse shafts and adapted upon movement of said tool slide toward and away from the work to transmit movement to said last named tool toward and away from the work.

10. In an automatic machine tool of the character described, a work table, a work carrying spindle carried thereby and having a longitudinal opening extending therethrough adapted to receive the work, a reciprocating tool slide mounted in relation to said spindle and including a tool adapted upon operation of said tool slide to be engaged with one end of the work, and means cooperatively connecting said last named tool to said tool slide whereby it is adapted upon operation of said tool slide to be moved into and out of relation to the work, said means including a vertical rack on said tool slide, a vertical rack on said last named tool, transverse shafts geared at one end to said respective racks, and a vertically disposed movement transmitting shaft provided at its ends with rack portions, said transverse shafts being geared at their other ends to said rack portions of the vertical shaft whereby said vertical shaft is adapted upon movement of said tool slide toward and away from the work to transmit movement to said last named tool toward and away from the work.

11. In an automatic machine tool of the character described, a work table, a work carrying spindle carried thereby and having a longitudinal opening extending therethrough adapted to receive the work, a reciprocating tool slide mounted in relation to said spindle and including a tool adapted upon operation of said tool slide to be engaged with one end of the work, and means cooperatively connecting said last named tool to said tool slide whereby it is adapted upon operation of said tool slide to be moved into and out of relation with said work, said means including a rack on said tool slide, a rack on said last named tool, a vertically disposed movement transmitting shaft operatively geared to said respective racks and adapted upon movement of said tool slide toward and away from the work to transmit movement to said last named tool toward and away from the work, and means intermediate the ends of said vertical rack adapted to adjust its length whereby the relative positions of said tool slide and last named tool may be adjusted with respect to each other.

12. In an automatic machine tool of the character described, a work table, a work carrying spindle carried thereby and having a longitudinal opening extending therethrough adapted to receive the work, a reciprocating tool slide mounted in relation to said spindle and including a tool adapted upon operation of said tool slide to be engaged at one end with the work, and means cooperatively connecting said last named tool to said tool slide whereby it is adapted upon operation of said tool slide to be moved into and out of relation with the work, said means including a rack on said tool slide, a rack on said last named tool, a vertically disposed movement transmitting shaft operatively geared to said respective racks and adapted upon movement of said tool slide toward and away from the work to transmit movement to said last named tool toward and away from the work, said vertical shaft comprising two end portions and a coupling sleeve threadably connected between them, and means for rotating said sleeve to adjust the length of said shaft whereby the relative positions of said tool slide and last named tool may be adjusted with respect to each other.

13. In an automatic machine tool of the character described, a work table, a work carrying spindle carried thereby and having a vertically disposed longitudinal opening extending therethrough adapted to receive the work in vertical relation, a chuck at the upper end of said spindle adapted to grip and center the work at its upper end, a chuck at the lower end of said spindle adapted to automatically grip and center the work at its lower end, a plurality of vertically movable tool means adapted to be simultaneously engaged with the work at its upper and lower ends, and means for imparting relative rotary movement between said tool means and said work.

14. In an automatic machine tool of the character described, a work table, a work carrying spindle carried thereby and having longitudinal opening extending therethrough adapted to receive the work, a floating chuck at the upper end of said spindle adapted to grip and center the work at its upper end, a chuck at the lower end of said spindle adapted to automatically grip and center the work at its lower end, tool means adapted to be engaged with the work, and means for imparting relative rotary movement between said tool means and said work.

15. In an automatic machine tool of the character described, a work table, a work carrying spindle carried thereby and having a longitudinal opening extending therethrough adapted to receive the work, a chuck at the upper end of said spindle adapted to grip and center the work at its upper end, a chuck at the lower end of said spindle adapted to automatically grip and center the work at its lower end and adapted upon the release of the work by said upper chuck to impart an ejecting movement to the work, tool means adapted to be engaged with the work, and means for imparting relative rotary movement between said tool means and said work.

16. In an automatic machine tool of the character described, a work table, a work carrying spindle carried thereby and having a longitudinal opening extending therethrough adapted to receive the work, a chuck at the upper end of said spindle adapted to grip and center the work at its upper end, a chuck at the lower end of said spindle adapted to automatically grip and center the work at its lower end and including a resiliently mounted sleeve adapted upon the release of the work by said upper chuck to impart an ejecting movement to the work, tool means adapted to be engaged with the work, and means for imparting relative rotary movement between said tool means and said work.

17. In an automatic machine tool of the character described, a work table, a work carrying spindle carried thereby and having a longitudinal opening extending therethrough adapted to receive the work, a chuck at the upper end of said spindle adapted to grip and center the work at its upper end, a chuck at the lower end of said spindle adapted to automatically grip and center the work at its lower end and including a resiliently mounted sleeve having a tapered bore and adapted upon release of the work by said upper chuck to impart an ejecting movement to the work, tool means adapted to be engaged with the work, and means for imparting relative rotary movement between said tool means and said work.

18. In an automatic machine tool of the character described, a work table, a work carrying spindle carried thereby and having a longitudinal opening extending therethrough adapted to receive the work, a chuck at the upper end of said spindle adapted to grip and center the work at its upper end, a tubular chuck at the lower end of said spindle open at each end and adapted to automatically grip and center the work at its lower end, a tool slide including a tool adapted to be engaged with the upper end of the work, a tool cooperatively connected therewith adapted upon operation of said tool slide to be engaged through said open ended lower chuck with the lower end of the work, and means for imparting relative rotary movement between said tool means and said work.

19. In an automatic machine tool of the character described, a work table, a work carrying spindle carried thereby and having a longitudinal opening extending therethrough adapted to receive the work, a chuck at the upper end of said spindle adapted to grip and center the work at its upper end, a tubular chuck at the lower end of said spindle having a tapered bore open at each end and adapted to automatically grip and center the work at its lower end, spring means associated with said lower chuck adapted to impart a limited upward ejecting movement thereto upon release of the work by said upper chuck, a tool slide including a tool adapted to be engaged with the upper end of the work, a tool cooperatively connected therewith adapted upon operation of said tool slide to be engaged through said open ended lower chuck with the lower end of the work, and means for imparting relative rotary movement between said tool means and said work.

20. An automatic machine tool comprising a base, a rotary carrier mounted thereon, a series of rotary work carrying spindles supported in said carrier and each having a loosely mounted laterally disposed roller at its lower end, indexing means for intermittently rotating said carrier to bring the spindle from one station to the next and including an oscillating arm adapted to be successively engaged with the respective rollers at the ends of said spindles, said rollers adapted to be partially rotated during each indexing operation to constantly shift their points of engagement with said arm, a tool means adapted to be engaged with the work at the several work stations.

21. In an automatic machine tool of the character described, a work table, a work carrying spindle carried thereby and adapted to receive the work, a chuck carried by said spindle adapted to secure and center the work, and work seating means comprising a movably mounted member having a predetermined work seating position, and manually operatable toggle means connected to said member and adapted to be operated to press the work to a predetermined position with respect to said chuck.

22. In an automatic machine tool of the character described, a work table, a work carrying spindle carried thereby adapted to receive the work, a chuck carried by said spindle adapted to secure and center the work, and work seating means comprising a movably mounted member having a predetermined work seating position and including contact portions at each side adapted to engage the work at diametrically opposite points, said member being adapted to be operated to press the work to a predetermined position with respect to said chuck.

23. In an automatic machine tool of the character described, a work table, a work carrying spindle carried thereby and adapted to receive the work, a chuck carried by said spindle adapted to secure and center the work, and work seating means comprising a movably mounted member having a predetermined work seating position, and including contact rollers provided at each side adapted to engage the work at diametrically opposite points, said member adapted to be operated to press the work to a predetermined position with respect to said chuck.

24. In an automatic machine tool of the character described, a work table, a work carrying spindle carried thereby and adapted to receive the work, a chuck carried by said spindle adapted to secure and center the work, and work seating means comprising a movably mounted member having a predetermined work seating position and including adjustably mounted contact portions adapted to engage the work at diametrically opposite points, said member adapted to be operated to press the work to a predetermined position with respect to said chuck.

25. In an automatic machine tool of the character described, a work table, a work carrying spindle carried thereby and adapted to receive the work, a chuck carried by said spindle adapted to secure and center the work, and work seating means comprising a movably mounted member having a predetermined work seating position and including resiliently mounted contact portions adapted to engage the work at diametrically opposite points, said member adapted to be operated to press the work to a predetermined position with respect to said chuck.

26. In an automatic machine tool of the character described, a work table, a work carrying spindle carried thereby, adapted to receive the work, a chuck carried by said spindle adapted to secure and center the work, work seating means comprising a movably mounted member having a predetermined work seating position and adapted to be operated to press the work to a predetermined position with respect to said chuck, said chuck adapted to be gripped with the work to retain it before disengagement of said seating means, and work ejecting means adapted upon disengagement of said chuck to eject the work with respect to said chuck.

27. In an automatic machine tool of the character described, a work table, a work carrying spindle carried thereby having an opening extending therethrough adapted to receive the work, a chuck at the upper end of said spindle adapted to secure and center the work, a resiliently mounted chuck at the lower end of said spindle adapted to automatically grip and center the work at its lower end, work seating means comprising a movably mounted member having a predetermined work seating position and adapted to be operated to press the work to a predetermined position with respect to said first chuck, said chuck adapted to be gripped with the work to retain it before disengagement of said seating means, said second chuck adapted upon disengagement of said first chuck to eject the work with respect thereto.

28. In an automatic machine tool of the character described, a work table, a work carrying spindle carried thereby adapted to receive the work, a chuck carried by said spindle adapted to secure and center the work, work seating means comprising a movably mounted member having a predetermined work seating position, adapted to be operated to press the work to a predetermined position with respect to said chuck, and to be removed from said seating position to inoperative position, cooperative mechanism associated with said work table, and locking means for said mechanism adapted in the seating position of said seating means to prevent operation of said mechanism and in the inoperative position to release said mechanism.

29. In an automatic machine tool of the character described, a work table, a work carrying spindle carried thereby and adapted to receive the work, a chuck carried by said spindle adapted to secure and center the work, work seating means comprising a movably mounted member having a predetermined work seating position and adapted to be operated to press the work to a predetermined position with respect to said chuck and to be removed from said seating position to inoperative position, a tool slide adapted to be operated to cooperate with said work table at a point removed from said seating means, and locking means adapted in the seating position of said seating means to prevent movement of said table into relation with said tool slides and in the inoperative position to permit such movement.

30. In an automatic machine tool comprising a base, a movable carrier mounted thereon, a work table on said carrier, a work carrying spindle carried by said table adapted to receive the work, a chuck carried by said spindle adapted to secure and center the work, work seating means comprising a movably mounted member having a predetermined work seating position, adapted to be operated to press the work to a predetermined position with respect to said chuck, and to be moved from said seating position to inoperative position, indexing mechanism associated with said carrier, and locking means for said mechanism adapted in the seating position of said seating means to prevent operation of said mechanism and in the inoperative position to release said mechanism.

31. An automatic machine tool comprising a base, a rotary carrier mounted thereon, a series of rotary work carrying spindles supported in said carrier, a chuck carried by each of said spindles adapted to receive and center the work, indexing means for intermittently rotating said carrier to bring the spindles from one station to the next, one of said stations constituting a loading and unloading station, work seating means disposed at said loading and unloading station comprising a movably mounted member having a predetermined work seating position adapted to be operated to press the work to a predetermined position with respect to said chuck, and to be moved from said seating position to inoperative position, locking means adapted to be operated by said seating means to lock said indexing means in the seating position of said seating means and to release said indexing means in the inoperative position of said seating means, and tool means associated with the other stations adapted to be engaged with the work.

32. In an automatic machine tool of the character described, a work table, a work carrying spindle carried thereby adapted to receive the work, a chuck carried by said spindle adapted to secure and center the work, work seating means comprising a movably mounted member having a predetermined work seating position, adapted to be operated to press the work to a predetermined position with respect to said chuck, and to be moved from said seating position to inoperative position, cooperative mechanism associated with said work table, and locking means for said mechanism including a locking slide having a rack portion, a toothed segment meshing with said rack portion, and a lever connected to said seating member and adapted as said member is operated to rotate said segment to reciprocate said slide, and whereby in the seating position of said member said slide is operated to locking position to prevent operation of said mechanism and in the inoperative position is reciprocated to release said mechanism.

Signed at Bridgeport, in the county of Fairfield and State of Connecticut.

EDWARD P. BULLARD, Jr.